United States Patent [19]

Tezuka et al.

[11] 4,402,468
[45] Sep. 6, 1983

[54] FILM TAKEUP SPOOL FOR CAMERA

[75] Inventors: Nobuo Tezuka; Tatsuya Taguchi, both of Tokyo, Japan

[73] Assignee: Canon Kabushiki Kaisha, Tokyo, Japan

[21] Appl. No.: 278,998

[22] Filed: Jun. 30, 1981

[30] Foreign Application Priority Data

Jul. 2, 1980 [JP] Japan ................................. 55-90875

[51] Int. Cl.³ ......................... G03B 1/04; B65H 75/24
[52] U.S. Cl. .................................... 242/71; 242/71.8; 242/71.1
[58] Field of Search ....................... 242/71, 71.1, 71.2, 242/71.3, 71.4, 71.5, 71.8, 74, 68.3; 354/212, 275

[56] References Cited

U.S. PATENT DOCUMENTS

| 2,701,507 | 2/1955 | Bergerhoff | 242/71 X |
| 3,752,416 | 8/1973 | Fukatsu | 242/74 |
| 4,275,855 | 6/1981 | Wakabayashi | 242/71.2 |

Primary Examiner—Stuart S. Levy
Assistant Examiner—Lloyd D. Doigan
Attorney, Agent, or Firm—Toren, McGeady and Stanger

[57] ABSTRACT

A film takeup spool provided with pawls in the interior of a sleeve hub thereof at such a location that pivot pins of the pawls are off-set from the axis of rotation of the sleeve hub. The pawls are urged by respective springs to project their teeth radially outwardly of the sleeve hub into the perforations of the film. When the spool is driven to rotate with a sufficient tension of the film, the pawl teeth are retracted into the sleeve hub, thus permitting a smooth winding up of the film on the sleeve hub of the takeup spool.

6 Claims, 5 Drawing Figures

FILM TAKEUP SPOOL FOR CAMERA

BACKGROUND OF THE INVENTION

1. Field of the Invention

This invention relates to film takeup spools for cameras.

2. Description of the Prior Art

In order to provide for quick loading of photographic film in the camera there has been provided a takeup spool which automatically grasps the film at a film leader thereof. In an example of a conventional takeup spool use is made of frictional means such as rubber pads. Because such a device is very susceptible to the influence of ambient temperature and humidity so that quick loading of the film can sometimes fail, there is thus lacking sufficient reliability.

In another example of a conventional spool the frictional rubber pads are replaced by pawls on the outer periphery of the sleeve hub of the spool. This automatic film takeup spool is, however, complicated in structure, unstable in its diameter of convolution of the film because of the positioning of a space for the pawls outside the sleeve hub, and apt to scratch the film surface as the film is being wound. With such situations in consideration, therefore, an attempt has been made to put the pawls inside the sleeve hub, for example, as shown in FIG. 1. This spool structure takes the form of an inner sleeve 2 having a great number of yieldable pawls 2a with their teeth 2b at the bottom ends thereof. These teeth 2b extend through respective square openings 1a of the sleeve hub 1 and project radially outwardly thereof into the perforations of the film when the film is engaged. After the film is wound up for some length, the tension of the film pushes the teeth 2b inwardly. Such a device, however, has disadvantages in that a sufficient grasping force is not always exerted on those of the teeth 2b which penetrate the perforations of film when the winding of the film starts, and that even after the film is wound to a certain diameter, those teeth 2b engaging the perforations of the film remain projected outwardly. Therefore, the wound film is caused to swell in diameter at this point, and the film will be damaged. Thus, the above-mentioned drawbacks are not all eliminated. In particular, the longer the length of projection of the tooth 2b as measured from the sleeve hub 1 is for the purpose of improving the quick engagement with the perforations of the film, the more this tendency is intensified. Though this tendency can be diminished by reducing the length of projection of the teeth 2b, an alternate problem arises in that there is a strong probability that the once established engagement of the teeth 2b with the perforations of film will be broken whereby a quick loading of the film can no longer be achieved.

SUMMARY OF THE INVENTION

Thus, the present invention seeks to eliminate all the above-mentioned drawbacks of the conventional device and to provide a film takeup spool rendering it possible for the leader of the film to be engaged on the sleeve hub by the tooth of a pawl whereby quick loading of the film is achieved without fail. As the film is pulled with a sufficient tangential force on the sleeve hub, that pawl is caused to turn so the the tooth while holding the film leader is retracted into the interior of the sleeve hub, whereby the subsequent winding of the film is stabilized.

Another feature of the present invention is the provision of a film takeup spool of such construction that the pivot pin of the pawl is positioned in off-set relation to the axis of rotation of the sleeve hub within the inner diameter of the sleeve hub, with the pawl is urged by a resilient member to project its tooth radially outwardly of the sleeve hub.

Still another feature of the present invention involves provision a film takeup spool of simplified structure such that the above-mentioned resilient member is formed together with the pawl.

These and other objects, features and advantages of the present invention will become more apparent from the following description of embodiments thereof by reference to the drawings.

DETAILED DESCRIPTION OF THE PREFERRED EMBODIMENTS

Figure 1:
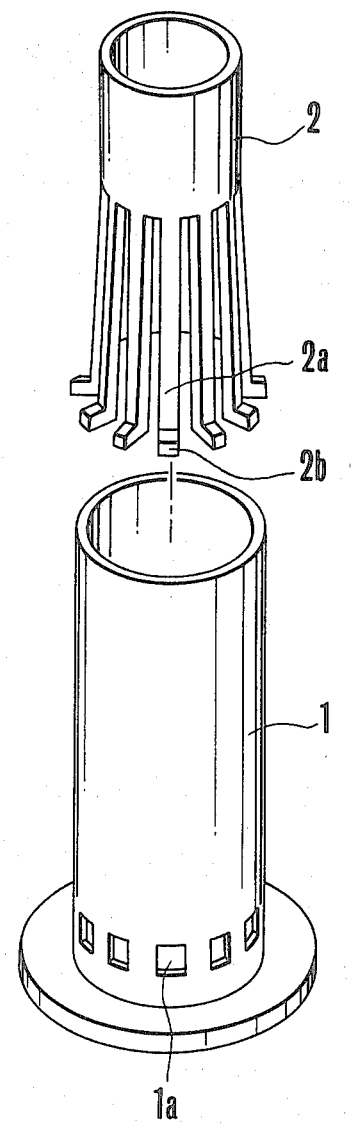
FIG. 1 is an exploded perspective view of a conventional pawl type takeup spool.
Figure 2:
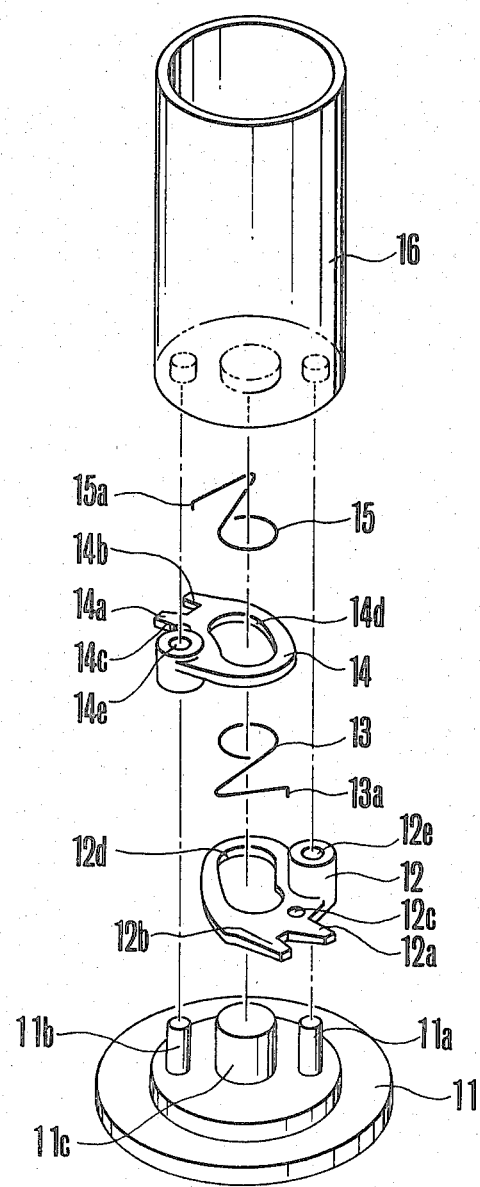
FIG. 2 is an exploded perspective view of the main parts of one embodiment of a takeup spool according to the present invention.

FIG. 2 shows the construction of the various parts of a film takeup spool of the invention. In this figure, 11 is a radial flange provided with two pivot pins 11a and 11b, and a stopper 11c. A pawl member 12 has a hole 12e freely fitted on the pivot pin 11a, and a second pawl member 14 is likewise fitted on the pivot pin 11b through a hole 14e. Further, the stopper 11c supports springs 13 and 15. Again, the pawl members 12 and 14 have teeth 12a, 12b, and 14a, 14b respectively, and are provided with pin holes 12c and 14c respectively in which are engaged the free ends of the springs 13 and 15. A reference numeral 16 denotes a sleeve hub of the spool.

Figure 3:
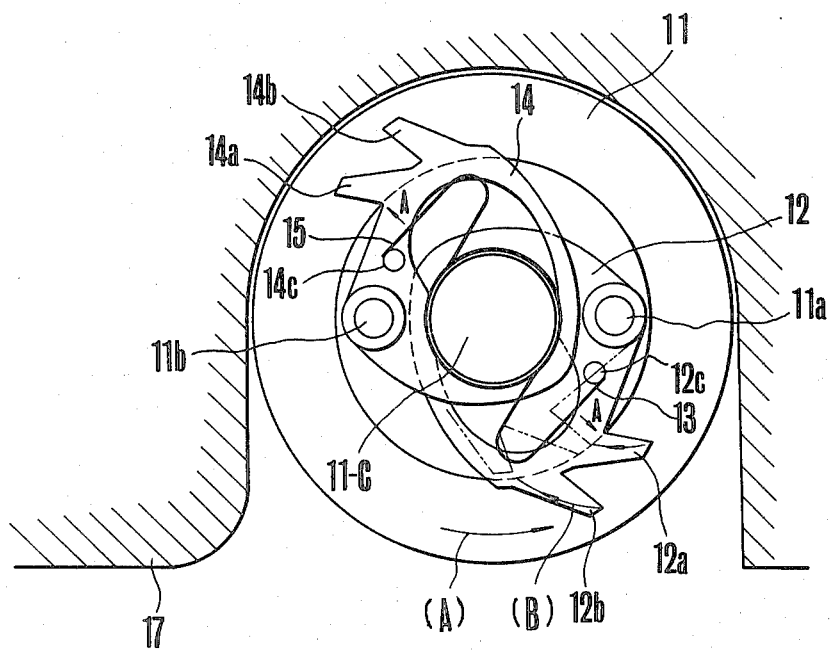
FIGS. 3 and 4 are elevational views of the takeup spool of FIG. 2 in an idle and an active position respectively.

As shown in FIG. 3, the springs 13 and 15 are tensioned respectively between the stopper 11c and the pin hole 12c, l and between the stopper 11c and the pin hole 14c thereby to urge the pawl members 12 and 14 to turn about the respective pivot pins 11a and 11b in a direction indicated by arrow A with their teeth 12a, 12b, 14a and 14b extending radially outwardly of the outer periphery of the sleeve hub 16. The length of projection of each tooth is preadjusted by so dimensioning arcuate slots 12d and 14d provided in the pawl members 12 and 14 respectively, so that the ends of the slots 12d and 14d about on the stopper 11c. Further, the rotative force of each of the above-described springs 13 and 15 is so adjusted that when the film 18 (see FIG. 4) turns around the sleeve hub 16, the pawl teeth 12a, 12b, 14a and 14b are retracted into the interior of the sleeve hub 16 by the tension of the film. A reference numeral 17 denotes a camera framework.

Figure 4:
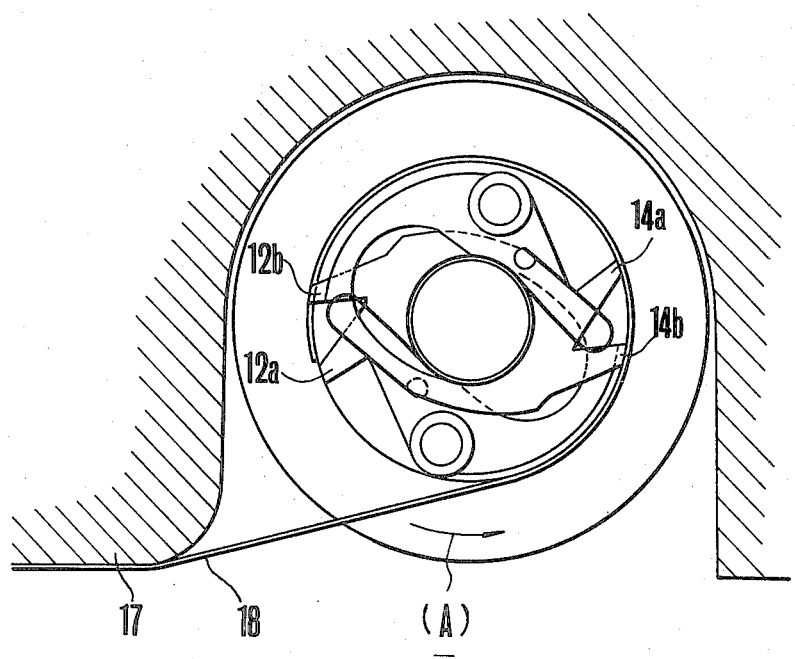
Figure 5:
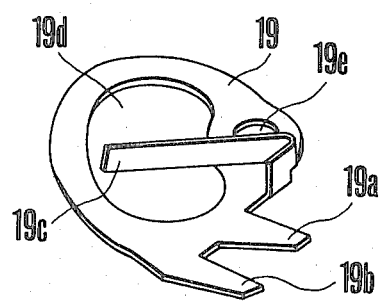
FIG. 5 is a perspective view showing another embodiment of the invention.

FIG. 5 shows another embodiment of the present invention where the pawl member 12(14) and the spring 13(15) of FIGS. 2 to 4 are constructed from a single metal plate. Reference numerals 19a and 19b denote toothed portions, and a reference numeral 19c denotes a spring operating in such a manner that when an arcuate slot 19d is freely fitted on the stopper 11c of FIG. 2, and a hole 19e on the pivot pin 11a, the teeth 19a and 19b are caused to project outwardly of the sleeve hub 16.

In the operation of the takeup spool of such construction, when the film 18 is engaged by one of the teeth, for example, 12b, engaging in one of the perforations of the film leader, as the takeup spool rotates in a direction indicated by arrow [A], the pawl member 12 is subjected to a force exerted in the reverse direction to that in which the spool rotates by the tension of the film resulting from the winding-up force. Therefore, the pawl member 12 is caused readily to turn about the pivot pin 11a in a direction indicated by arrow [B] against the force of the spring 13 (acting in A direction in FIG. 3), thus retiring into the interior of the sleeve hub 16 until a position indicated in FIG. 4. As a result, after the film leader while being held by the tooth 12b has been taken up on the sleeve hub 16, the remaining portion of film can be smoothly wound on the spool without deformation out of the roundness of the sleeve hub 16. Then, after the film is rewound to take the film leader off the spool, the pawl members 12 and 14 are returned to their initial positions shown in FIG. 3 by the force of the springs 13 and 15. Thus, the camera is ready for the next loading of film.

As has been described in greater detail above, according to the present invention, the film takeup spool is provided with an arrangement of pawl members for engagement in the perforations of the film leader such that these pawl members are pivotal at the axes off-set from the center of rotation of the spool whereby the teeth of the pawl members exposed out of the sleeve hub are retracted into the interior of the sleeve hub after movement in a direction opposite to that in which the surface of the sleeve hub moves when the tension of the film acts on the tangential direction to the takeup spool. Therefore, even when the length of the projection of the tooth is relatively long in order to insure that the tooth catches a perforation with high reliability, there is no possibility of occurrence of a deformed winding of the film on the spool. Further, since the teeth of the pawl members which engage in the perforation of the film leader are later moved inwardly, the established engagement of a tooth in a perforation is further strengthened, whereby quick loading of the film is carried out with high reliability.

Therefore, the film is protected from scratches other wise resulting from the frictional contact with the wall of the spool chamber in the camera housing. Another advantage of the present invention is that the mechanism for moving the pawl members with their teeth across the wall of the sleeve hub can be simplified in structure, thus contributing to an improvement of the accuracy and reliability of the takeup spool, while nevertheless reducing production cost. Further, the film quick loading mechanism of the invention occupies a very small space at the bottom of the sleeve hub, leaving a large proportion of the space in the sleeve hub to be effectively used. For example, an electric motor, or a battery can be installed in the remaining space within the sleeve hub of the spool, and there is room for improving the space factor of the camera body.

In the case of FIG. 5 embodiment, the number of parts is reduced, and assembly is facilitated.

While specific embodiments of the invention have been shown and described in detail to illustrate the application of the inventive principles, it will be understood that the invention may be embodied otherwise without departing from such principles.

What is claimed is:

1. A film takeup spool for a camera, comprising:
   (a) a rotary member having a rotary shaft and pivot pins;
   (b) a sleeve hub rotating with the axis of rotation of said rotary member as the center of rotation thereof in unison with said rotary member when film is wound thereon;
   (c) engagement members each having a shaft hole fitted on said pivot pin and a guide slot through which said rotary shaft extends, and having a toothed portion for engagement in the perforations of said film, said toothed portion moving as said rotary member rotates; and
   (d) resilient members imparting bias forces to said engagement members whereby said toothed portions are caused to project radially outwardly of said sleeve hub.

2. A spool according to claim 1, wherein said resilient members are formed integrally with said engagement members.

3. A film takeup spool for a camera, comprising:
   (a) a rotary member having a rotary shaft and pivot pins;
   (b) a sleeve hub rotating with the axis of rotation of said rotary member as the center of rotation thereof in unison with said rotary member when a film is wound thereon; and
   (c) engagement members each having a hole fitted on said pivot pin, a guide slot through which said rotary shaft penetrates, a toothed portion for engagement in the perforations of the film, and a resilient portion pressed against said rotary shaft to exert a bias force by which said toothed portion is caused to project radially outwardly of said sleeve hub, said engagement members moving as said sleeve hub rotates.

4. A film takeup spool for a camera comprising:
   (a) a sleeve hub; and
   (b) engagement members having centers of rotation at off-set positions from the center of rotation of said sleeve hub within the inner diameter of said sleeve hub, said members each having a toothed portion for engagement in the perforations of a film and a resilient portion for imparting a bias force to said engagement member for pivotal movement about said center of rotation with said toothed portion being caused to project radially outwardly of said sleeve hub, whereby as said engagement members move in unison with said sleeve hub, when said toothed portion engages in the perforations of said film, the resultant tension of the film moves said toothed portion into the interior of said sleeve hub against the bias force of said resilient portion.

5. A film takeup spool for a camera comprising:
   (a) a sleeve hub rotatable with a rotary shaft as the center of rotation;
   (b) engagement members each having a guide slot through which said rotary shaft extends, and a toothed portion for engagement with the perforations of a film, and being rotatably fitted at pivot points off-set from the center of rotation of said sleeve hub; and
   (c) resilient members urging said engagement members to turn about their pivot points with their toothed portions projecting radially outwardly of said sleeve hub.

6. A film takeup spool for a camera, comprising:
(a) a rotary member having a rotary shaft and pivot pins;
(b) a sleeve hub rotating with the axis of rotation of said rotary member as the center of rotation thereof in unison with said rotary member when film is wound thereon;
(c) an engagement member having a shaft hole fitted on said pivot pin and a guide slot through which said rotary shaft extends, and having a toothed portion for engagement in the perforations of said film, said toothed portion moving as said rotary member rotates; and
(d) a resilient member imparting bias forces to said engagement member whereby said toothed portions are caused to project radially outwardly of said sleeve hub.

* * * * *